United States Patent [19]
Pezzino

[11] 3,786,780
[45] Jan. 22, 1974

[54] PORTABLE CANINE TOILET
[76] Inventor: Carmine Pezzino, 251 Westminster, Brooklyn, N.Y. 11226
[22] Filed: Apr. 3, 1972
[21] Appl. No.: 240,505

[52] U.S. Cl.................. 119/1, 294/1 R, 294/19 R
[51] Int. Cl...................... A01k 23/00, A47f 13/06
[58] Field of Search ... 119/1, 95; 294/19 R, 55, 1 R

[56] References Cited
UNITED STATES PATENTS

| 3,052,214 | 9/1962 | Johnson | 119/1 X |
| 3,446,525 | 5/1969 | Jones | 294/19 R |
| 3,688,741 | 9/1972 | Thompson et al. | 119/1 |
| 3,281,178 | 10/1966 | Fisher | 294/55 X |
| 3,146,015 | 8/1964 | Roberge | 294/19 R |
| 3,626,900 | 12/1971 | Failla | 119/1 |
| 3,688,483 | 9/1972 | Hamilton | 294/55 X |
| 3,527,492 | 9/1970 | Hollis | 119/1 UX |

Primary Examiner—Robert Peshock
Assistant Examiner—James H. Czerwonky
Attorney, Agent, or Firm—Charles J. Speciale

[57] ABSTRACT

As a portable canine toilet, in combination a holder and disposable waste receiving means adapted to be removably fitted upon the holder. The holder has a projecting means mounted on its rod portion, and the receiving means has a partially circumferential sleeve along its upper portion and into which the lower part of the holder is inserted. The receiving means also has a stringed collar at the top of the upper portion, the protruding portion of the string normally positioned on the projecting means.

1 Claim, 6 Drawing Figures

PATENTED JAN 22 1974 3,786,780

PORTABLE CANINE TOILET

BACKGROUND OF THE INVENTION

1. Field of the Invention:

This invention relates generally to anti-pollution devices and more particularly to a portable canine toilet for receiving canine waste products for disposal.

2. Description of the Prior Art

Pollution of the air, waterways and streets is becoming more and more a problem of immense scope, nationally, as well as world-wide. Specifically, and the problem to which the present invention is directed, is the pollution of city streets by dog waste. Although "Curb Your Dog" signs are frequently encountered and sometimes obeyed, this type of solution to the pollution problem is not effective since it only results in polluted curb sides, at best. It would therefore be of tremendous advantage if dog waste products, especially solid waste, could be eliminated altogether from the city streets.

SUMMARY OF THE INVENTION

It is therefore, among one of the principal objectives of this invention to provide a device which will eliminate to a great extent the aforementioned dog pollution problem.

In accord with the present invention there has now been provided a portable canine toilet easily carried by the dog owner when the dog is walked, which comprises in combination a holder and disposable waste receiving means adapted to be removably fitted upon said holder.

BRIEF DESCRIPTION OF THE DRAWINGS

The invention will be hereinafter more fully described with reference to the accompanying drawing in which.

DESCRIPTION OF THE PREFERRED EMBODIMENTS

Figure 1:
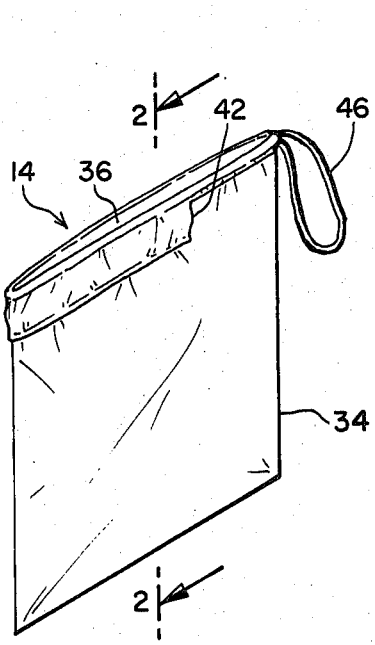
FIG. 1 is a view in perspective of the disposable waste receiving means of the inventive combination.
Figure 2:
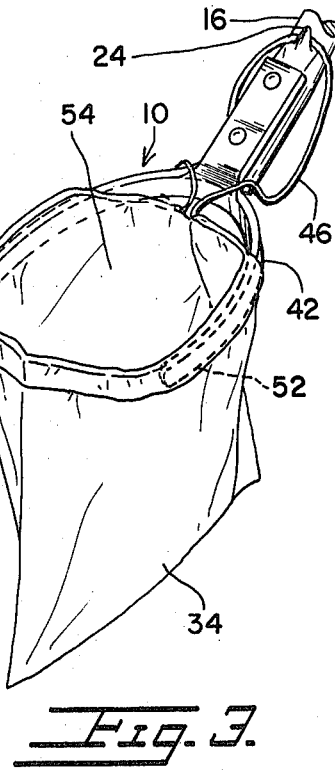
FIG. 2 is a sectional view taken along line 2—2 of FIG. 1 in the direction of the arrows.
Figure 3:
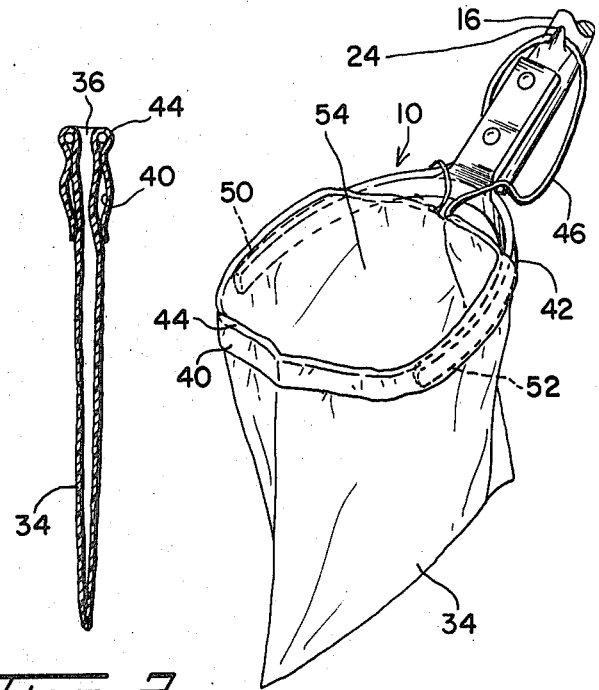
FIG. 3 is a view in perspective, partially fragmented, of the inventive combination.
Figure 4:
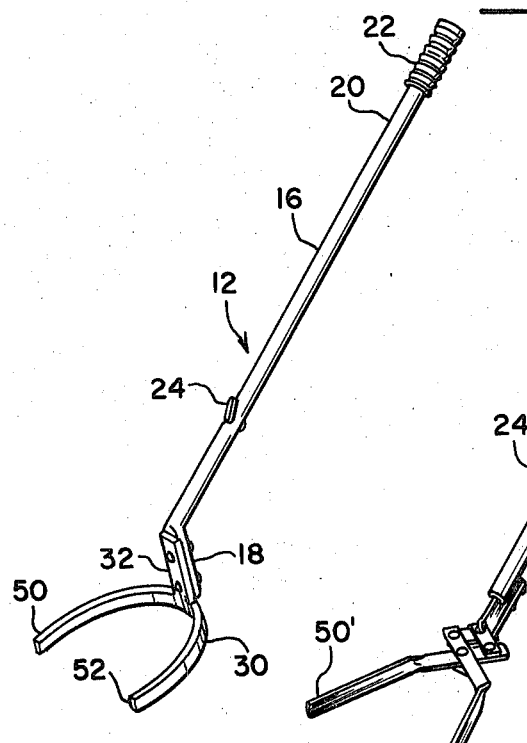
FIG. 4,5 and 6 are views in perspective of different embodiments of the holder portion of the inventive combination.

Referring now to the figures of the drawing in detail, and specifically to FIGS. 1–4, the portable canine toilet 10 of the invention comprises in combination a holder 12 and disposable waste receiving means 14.

Holder 12 further comprises an elongated rod 16 of which the lower end 18 is bent at an angle to the horizontal (anywhere from 10°–90°) and of which its upper end 20 may be provided with a non-slip handle 22 (although this is not essential). Intermediate the approximate mid-point of rod 16 and its angled lower end 18 is provided a boss-like projection 24 which is bent towards the upper end 20. Rod 16 may be constructed of any suitably rigid material such as a light metal or a plastic.

A horse-shoe shaped member 30 is mounted to rod 16 at lower end 18 by means of an inter-connecting flat bracket 32 which is integral with member 30. Bracket 32 and lower end 18 are mounted in face-to-face abutment by any suitable means such as bolting, welding, cementing, or the like. Similarly, member 30 may be made of any suitably rigid material, as above described.

Disposable waste means 14 further comprise a plastic bag 34 open as at 36. The bag may be of rectangular shape, but this is not essential. What is essential is that the bag 34 be provided with a sleeve 40 which extends about three-quarters of the way around the top of the bag and is open at both ends 42 thereof. Further, along the uppermost lip of the bag there is provided a collar 44 into which is fitted a string or cord 46. The string is allowed to protrude out of the collar for reasons which will be set forth hereinbelow.

Describing now the operation of the invention what is done is to removably fit the bag 34 onto the holder 12. This is accomplished by sliding prongs 50,52 (formed by virtue of the horse-shoe shape of member 30) of member 50 into the collar 40 of the bag via the (slit) openings 42. The protruding string 46 is allowed to loop over the projection 24 provided on the rod for that purpose. Thus, when the bag is so fitted a large opening 54 results. Accordingly, when one is walking his dog all that need be done is to place the opening 54 in position to catch the solid dog waste into the bag rather than letting it fall on the street. When the dog is finished the bag is pulled off the prongs and the string, being looped over 24, drawn tight upon itself closing the opening in the bag. The bag is then thrown into the nearest receptacle.

Figure 5:
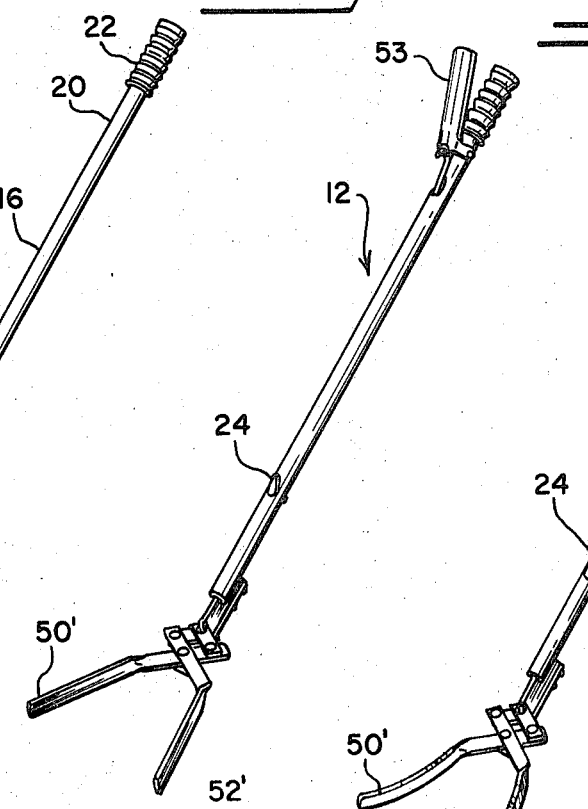
Figure 6:
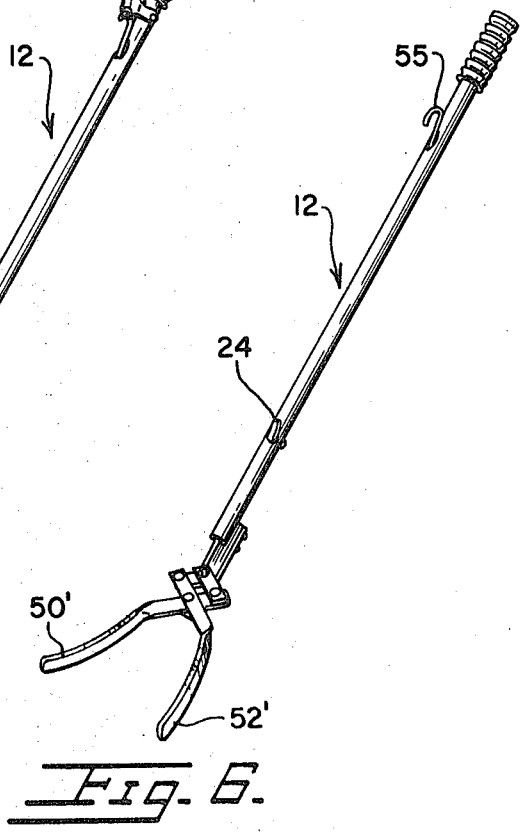

FIGS. 5 and 6 show different embodiments of the holder 12 wherein the prongs 50',52' are made adjustable by means of an interior spring (not shown). This spring action is conventional and may be seen in use in most grocery stores for removing articles from high shelves. In the present instance the spring may be connected to a squeezable handle 53 or a pullable hook 55. Thus to fit the bag into prongs 50', 52', all that need be done, for example, is to squeeze the handle 53 thereby scissoringly bringing the prongs together and they are then inserted into the slit openings of the bag. When the handle 53 is released the prongs spring apart, thereby opening the bag for use. Conversely, to facilitate removal of the bag the handle is squeezed.

It can be seen that the present invention provides a portable canine toilet, which, if conscientously used by dog owners, will materially result in the lessening of street and curb pollution. It is indeed a small price for the dog owner to pay for the privilege of owning a dog.

What is claimed is:

1. As a portable canine toilet, in combination a holder and disposable canine waste receiving means, said waste receiving means being adapted to be removably fitted upon said holder, wherein said holder further comprises an elongated rod having mounted at one extremity thereof a horse-shoe shaped member having a pair of oppositely, spatially disposed prongs and wherein said disposable canine waste receiving means comprise a bag openable at its top and having a partially circumferential sleeve formed along its upper portion relative to the top and into which said prongs are removably insertable resulting in opening said bag, wherein said rod has projecting means mounted thereon and wherein said bag also has a stringed collar formed along its top-most portion of said upper portion, the string in the collar being allowed to protrude therefrom, a portion of the protruding string normally positioned on and being loopable over said projecting means so that when said bag is removed from said holder the opening of said bag will be closed.

* * * * *